United States Patent [19]

Mano

[11] 4,373,231
[45] Feb. 15, 1983

[54] APPARATUS FOR CUTTING CONNECTING PORTIONS OF A SAUSAGE CHAIN

[75] Inventor: Tetsuro Mano, Tokyo, Japan

[73] Assignee: Totai Co., Ltd., Tokyo, Japan

[21] Appl. No.: 221,573

[22] Filed: Dec. 31, 1980

[30] Foreign Application Priority Data

Mar. 13, 1980 [JP] Japan .................................. 55/32093
Mar. 13, 1980 [JP] Japan ............................ 55/33090[U]

[51] Int. Cl.³ .......................................... A22C 11/00
[52] U.S. Cl. .......................................... 17/1 F; 17/34
[58] Field of Search .................. 17/1 F, 1 R, 49, 33, 17/34

[56] References Cited

U.S. PATENT DOCUMENTS

| 3,487,499 | 1/1970 | Klyce | 17/1 F |
| 3,545,035 | 12/1970 | Piereder | 17/1 F |
| 3,659,316 | 5/1972 | Berendt et al. | 17/1 F |

*Primary Examiner*—Willie G. Abercrombie

[57] ABSTRACT

Apparatus for cutting the connecting portions of a sausage chain. A sausage chain, whose position is corrected by position correcting rollers arrayed in the form of an arc, is fed to a driving drum by a transferring means. Pressing rollers arranged to face the sausage receiving surface of the driving drum are adapted to convey the sausage chain in sliding contact therewith. The connecting portions of the sausage chain are cut by a cutter which is disposed along the sausage conveyance path. The pressing rollers may be idle, or they may be selectively idle or driven.

6 Claims, 14 Drawing Figures

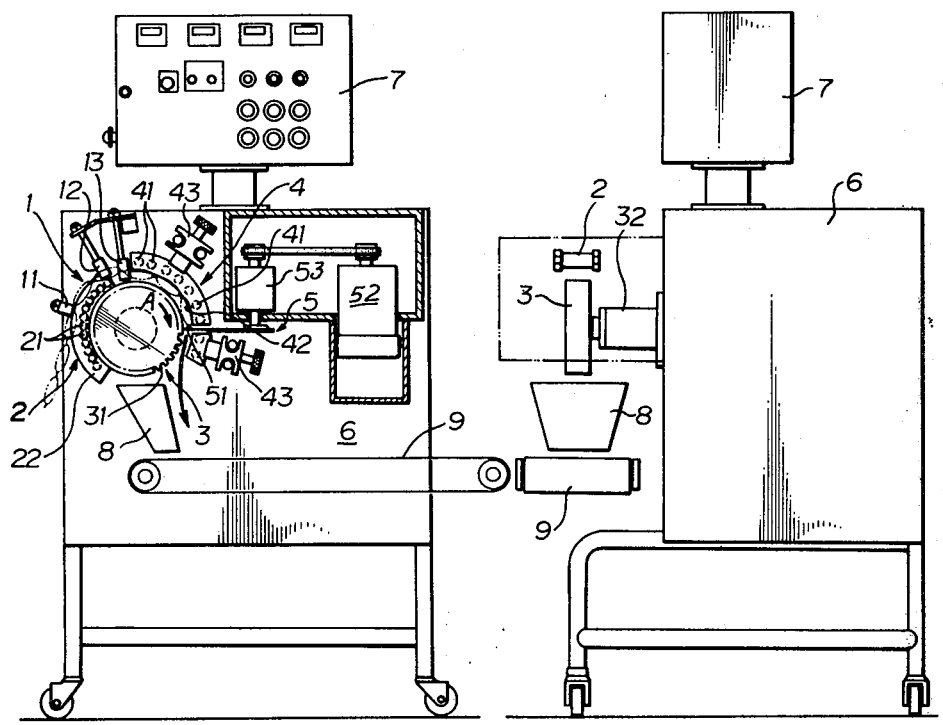

APPARATUS FOR CUTTING CONNECTING PORTIONS OF A SAUSAGE CHAIN

This invention relates to an apparatus for cutting the connecting portions of a sausage chain in which a number of sausages packed in a casing and interconnected through connecting portions, such as Vienna sausages, are cut off into one or several pieces at a time.

A known sausage connecting portion cutting apparatus of this type conventionally includes a transfer mechanism provided in the path of a sausage conveyor to embrace the sausages from both sides and to transfer the sausages, a tensioning mechanism provided in back of the transfer mechanism to feed the sausages at a speed higher than that of the transfer mechanism thereby to apply tension to the sausage connecting portion, and a mechanism provided along the tensioning mechanism to cut the tensioned connecting portions. In such an apparatus, the transfer mechanism is composed of confronting arrangements of looped belts rotatably disposed on pulleys, the sausages being embraced in the linear path formed between the looped belts.

It should be noted that sausages stuffed in a casing have a linear outer configuration, and that the connecting portion is positioned at the center of the sausage diameter. However, when the sausages are subjected to a heat treatment, they develop an arcuate configuration, so that the connecting portion is displaced from the sausage center. In a case wherein a sausage chain is to be cut off with the above-mentioned cutting device, the arcuate sausages are reformed into a linear configuration and, hence, elongated when embraced between the looped belts of the transfer mechanism. Therefore, the connecting portion is bent and the front and rear ends of adjacent sausages abut against each other. In consequence, it is difficult to get an accurate cutting timing of the cutting portion, and the front end or rear end of a sausage piece is frequently accidentally cut.

Accordingly, it is an object of the present invention to provide a sausage connecting portion cutting apparatus which eliminates the above-mentioned defects, making it possible to cut off sausages from a sausage chain in an accurate manner.

It is another object of the present invention to provide a sausage connecting portion cutting apparatus that enables sausages to be conveyed and cut with the lower arcuate surface thereof as the bottom side thereof.

It is a further object of the present invention to provide a sausage connecting portion cutting apparatus which enables the speed of feeding a chain of sausages to be held constant at all times.

To achieve the foregoing objects, the present invention provides a sausage connecting portion cutting apparatus which comprises a sausage pose or position correcting means arranged in the form of an arc, a sausage guide means, a driving drum whose circumferential surface receives sausages delivered through said guide means, a pressing means arranged to face the sausage receiving surface of said driving drum, and a cutter means for cutting the connecting portions between sausages, said cutter mechanism being arranged along a sausage conveying path of said driving drum. The pressing means comprises a plurality of idler rollers formed of flexible plastic tubes in the form of hollow, cylindrical, air-tight bodies.

BRIEF DESCRIPTION OF THE DRAWINGS

FIG. 1-*a* is a fragmentary view in side elevation of a chain of sausages which have not been subjected to heat treatment;

FIG. 1-*b* is a view in end elevation of the sausage chain of FIG. 1 looking in the direction from right to left in FIG. 1-*a*;

FIG. 1-*c* is a fragmentary view in side elevation of a chain of sausages which have been subjected to heat treatment;

FIG. 1-*d* is a view in end elevation of the sausage chain of FIG. 1 looking in the direction from right to left in FIG. 1-*c*;

FIG. 2 is a side view of a first embodiment of a sausage connection portion cutting apparatus embodying the invention;

FIG. 3 is a front view of the apparatus shown in FIG. 2;

DESCRIPTION OF THE PREFERRED EMBODIMENTS

Figure 4:
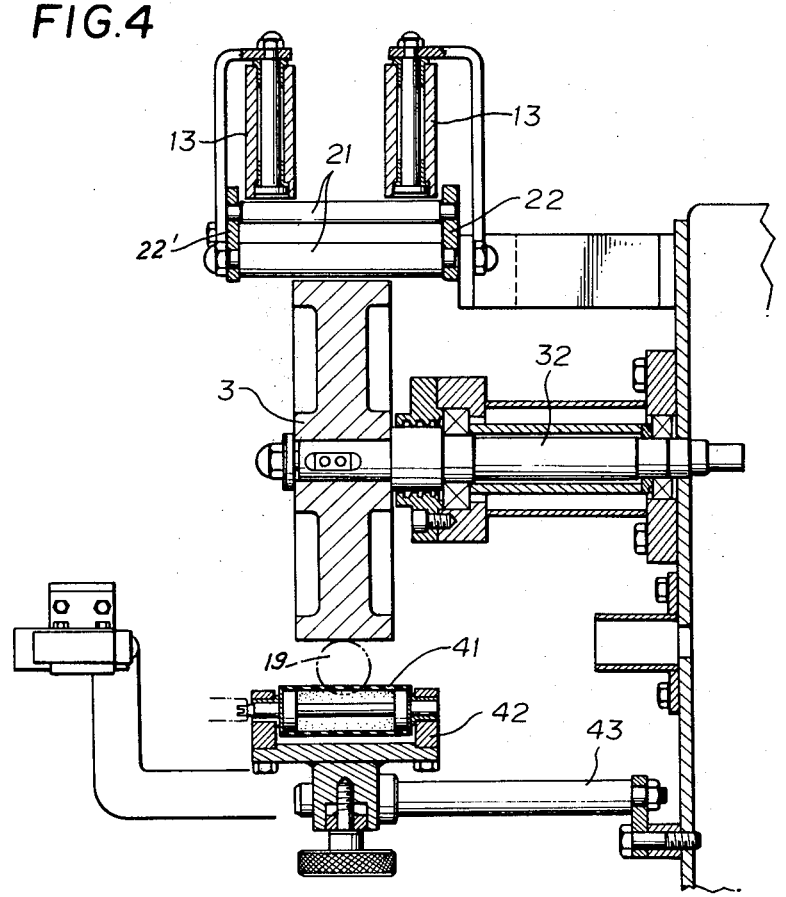
FIG. 4 is an enlarged cross-sectional view of a portion of the apparatus shown in FIG. 2.

In FIG. 1-*a* there is fragmentarily shown a chain 15 of sausages 16 which have not been subjected to heat treatment. Such sausages are connected by connecting portions 17, which, as shown in FIG. 1-*b*, are disposed on the longitudinal axes of the sausages.

In FIG. 1-*c* there is fragmentarily shown a chain 18 of sausages 19 which have been subjected to heat treatment. Sausages 19 have an arcuate configuration, the upper surfaces of the sausages being convex and the lower surfaces of the sausages being concave, the connecting portions 17 being downwardly disposed, as shown in FIG. 1-*d*.

The sausage connecting portion cutting apparatus of FIGS. 1–7, inclusive, which is adapted for cutting a sausage chain 18 (FIG. 1-*c*), is equipped with sausage guide means 1 (FIGS. 2 and 3) sausage position correcting means 2, a driving drum 3 for receiving sausages delivered through the guide means, a sausage pressing means 4, and a cutter mechanism 5 for cutting the connecting portions of the sausage chain.

Figure 5:
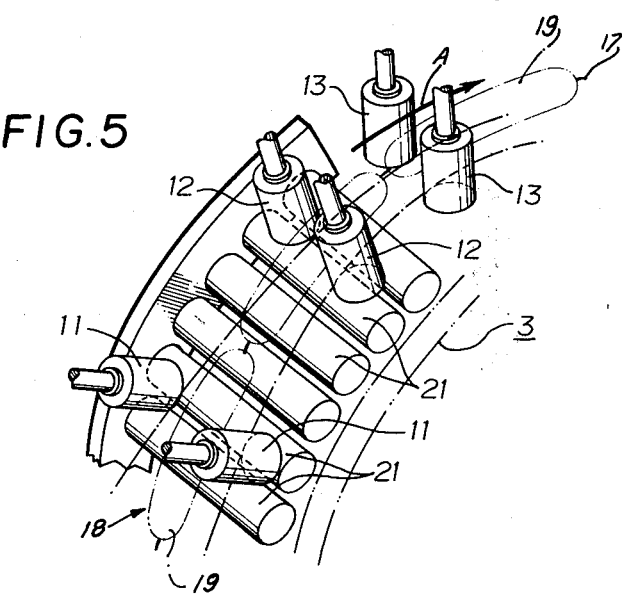
FIG. 5 is an enlarged perspective view of a sausage guide meant.

The driving drum 3 defines a circle of a large diameter and, as can be understood from FIG. 4, is connected to a driving motor (not shown) through a drive shaft 32 which is secured to the drum at the center thereof, the drum being adapted so as to rotate in the clockwise direction A in FIGS. 2 and 5. Teeth 31 are cut into the outer circumference of the driving drum 3 so as to maintain the proper contact between sausages 19 and the outer circumference of the driving drum.

FIG. 5 shows the guide means 1 and the sausage position correcting means 2. The guide means 1 consists of pairs of rollers 11, 12, 13 each extending in a direction perpendicular to the outer circumferential surface of the driving drum 3. The rollers 11, 12, 13 are arranged so that the spacing between the rollers in each pair gradually narrows in the direction of sausage transferring until the spacing between the most forward roller pair 13 is approximately the same as the sausage diameter. The sausage position correcting means 2 is composed of a plurality of laterally extending rollers 21 provided along the circumference of the driving drum 3. Each roller 21 is an idly running roller which is rotatably journalled between side plates 22, 22' disposed at the right and left of the rollers. The rollers 21 slidingly guide the sausages 19 on the arcuate surface which the rollers form.

Figure 6:
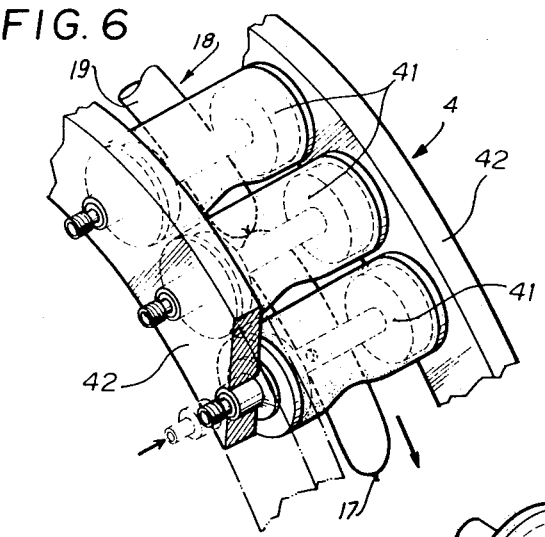
FIG. 6 is an enlarged perspective view of the sausage pressing means.

FIG. 6 illustrates the pressing means 4. The pressing means 4 is provided downstream of the guide means 1 and is arranged to have an arcuate configuration with a constant spacing from the surface of the driving drum 3. Each pressing roller 41 is rotatably journalled between side plates 42 disposed at the left and right of the rollers, and is adapted to slidingly pass the sausages 19, which are conveyed by the driving drum 3, against the surface of the drum 3. The side plates 42, 42' are removably screwed onto a bracket 43 and can be exchanged with other guide rollers so that the spacing between the rollers and the surface of the drum can be suitably changed over a range of from 16 to 38 mm.

The cutter mechanism 5 includes a cutter blade 51 (FIG. 2) which is disposed at a position below a horizontal line passing through the center of the driving drum 3 and which is interposed between a portion of the rollers in the pressing means 4, and is adapted such that the cutter blade 51 is reciprocatingly driven horizontally by a driving motor 52 through an electromagnetic clutch-blade 53 to which the rear portion of the cutter blade is connected. The driving motor 52 operates through the electromagnetic clutch-blade 53 to drive the blade 51 horizontally to cut sausage connecting portions 17 in response to the detection of a sausage connecting portion 17 by means of a photo-electric tube (not shown) disposed at a position above the blade 51.

The sausage connecting portion cutting apparatus having the above construction is operated at a control panel 7 disposed on the upper side of the machine frame 6.

More specifically, a number of interconnected sausages are accommodated in a suitable stacker (not shown) mounted at the lower left of FIG. 2. A sausage chain composed of sausages 19 is manually fed into the guide means 1, starting with the head of the sausage chain, the sausages forming the chain being clamped and guided between the driving drum 3 and the pressing means 4, whereupon the sausages are pulled out of the stacker one after another and transferred by being pulled upwardly by the driving force of the driving drum 3. While moving upwardly the sausages slide along the position correcting rollers 2. Since the rollers 2 are arranged in the form of an arc, each roller rotates on its axis and corrects the positioning of each sausage so that the downwardly curved side of each sausage is directed toward the side of the roller surfaces. The sausages are supplied in this state from the guide means 1 to the driving drum 3. Since the conveyance path between the driving drum 3 and the pressing means 4 also has an arcuate shape, the sausages are conveyed with their downwardly curved side facing toward the surface of the driving drum, so that the body of each sausage undergoes almost no expansion and contraction. Accordingly, there is absolutely no possibility that the connecting portions will be bent because of the narrowing of the distance between successive sausages. Furthermore, since the sausages are conveyed at a constant speed by the pressing and pulling action of the teeth 31 of the driving drum 3 and the pressing rollers 41, it is possible for the connecting strips to be accurately cut by the cutter mechanism 5 which is actuated in response to the detection of the photoelectric tube when it detects a connecting portion of sausage chain. The cut sausages are then permitted to fall onto a belt conveyor 9 through a chute 8 disposed below the driving drum 3, and are conveyed to the next processing area.

Figure 7:
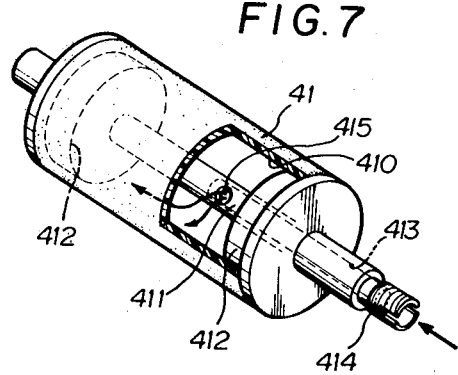
FIG. 7 is an enlarged cross-sectional view, partially cut away of a pressing roller.

FIG. 7 shows a roller 41 of the pressing means 4 of FIG. 6. The roller 41 comprises a hollow, cylindrical air-tight body formed of a flexible tube 410. A tube which does not permit the leakage of air, such as a plastic tube or the like, is used to fabricate the flexible tube 410, and the tube is sealed at the left and right ends by circular plugs 412, 412' which are formed on the axis of the drum axle 411 at prescribed spaced-apart positions. The axle 411 has an air sucking passage 413 along its core, and is adapted such that filling air under pressure from a valve portion 414 formed at the end of the axle can be supplied into the tube from an opening 415 inside the tube.

With the pressing rollers constructed in this manner, the operation is such that the sausages transferred by the circumferential surface of the driving drum 3 can be pressed against the outer circumference of the drum and fed at a constant speed. As the sausages are fed in between the driving drum 3 and the pressing rollers 41, the surfaces of the pressing rollers 41 in contact with the sausages are depressed in accordance with the shape of the sausages. This depression is formed by the flexible tube portion and allows the bodies of the rollers 41 to come into surface contact with the sausage. The pressing rollers 41, owing to their construction wherein the interior of the tube forms a hollow air-tight body, allows the sausages to be pressed strongly by the internal air pressure. Accordingly, the arrangement is such that the sausages transferred by the turning effort of the driving drum are brought into pressured contact with the drum surface by the pressing rollers and are fed at a constant speed without slipping between the contacting surfaces. Moreover, the pressing rollers 41 turn idly in accordance with the movement of the sausages, so that the sausages can be fed smoothly.

Figure 8:
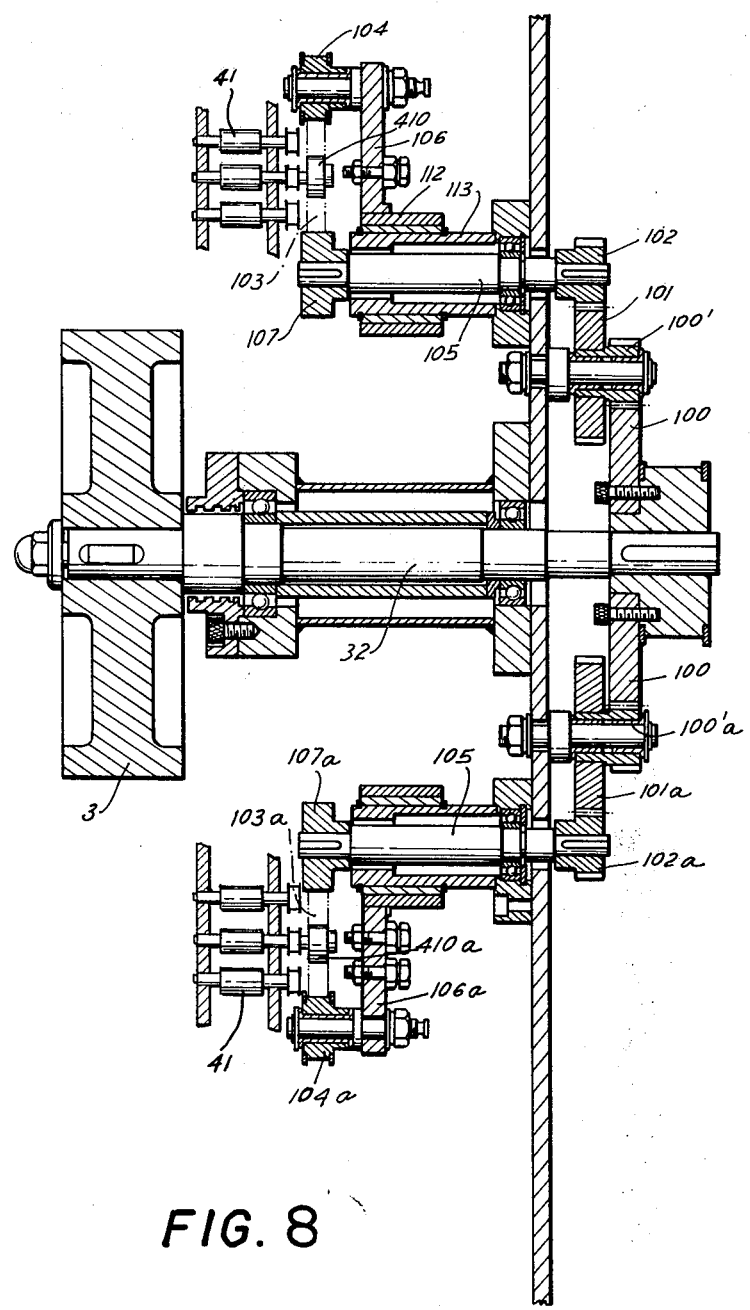
FIG. 8 is a fragmentary view, partially in elevation and partially in section of the driving mechanism for the sausage presser rollers of a third embodiment of the invention.

The mechanism in the third embodiment of the invention which permits the pressure rollers either to be idle or driven is shown in FIGS. 8-11, inclusive. As shown in FIG. 8, the shaft 32 which has the drum 3 affixed thereto has a large gear 100 fixedly mounted on the outer end thereof. Gear 100 constitutes the means for driving an upper train of serially connected driving elements for driving a "Timing belt" 103, and a similar lower driving train for driving a "Timing belt" 103-a. Parts in the lower driving train which are similar to those in the upper driving train are designated by the same reference characters with an added a. It will suffice here to describe only the upper driving train.

The gear 100 meshes with a pinion 100' which is fixedly connected to a larger gear 101. Gear 101 meshes with a pinion 102 which is affixed to a shaft 105. All of the above named gears and shafts rotate about fixed centers, and are supported on a main vertical member of the housing of the apparatus, as shown in FIG. 8.

A "Timing belt" pulley 107 is affixed to the inner end of the shaft 105. The shaft 105 extends inwardly within a fixed sleeve 113; an outer sleeve 112 is rotatably mounted upon the inner end of sleeve 113. Affixed to sleeve 112 is a radially extending arm 106 having a stub shaft extending transversely of its outer end, such stub shaft rotatably mounting a second "Timing belt" pulley 104. The "Timing belt" 103 is entrained between pulleys 107 and 104. It will be seen that such driving train permits the arm 106 and the belt 103 to be rotated about the axis of the shaft while retaining a drive between it and the shaft 32. Such construction affords a selectively operated drive between the belt 103 and a pulley 401 which serves to drive a group of presser rollers 41 when the belt 103 is in driving engagement with the pulley 410. Swinging of the arm 106 and the belt 103 in the appropriate direction disengages the belt 103 from the pulley 410, so that the respective group of presser rollers 41 then become idle rollers. The groups of rollers and the respective driving pulleys 410, 410-a therefor are shown on a larger scale in FIG. 10.

Figure 10:
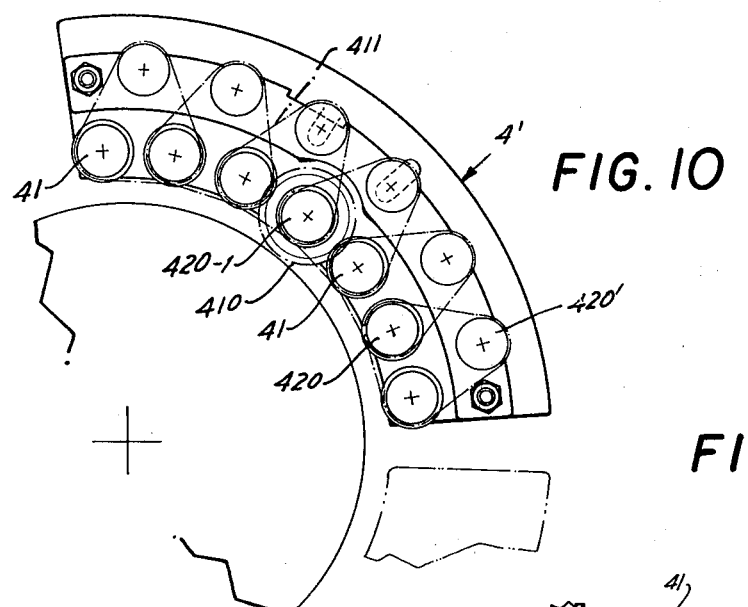
FIG. 10 is a fragmentary view in end elevation of the mechanism for driving the pressing rollers of the end embodiment of FIGS. 8 and 9.
Figure 9:
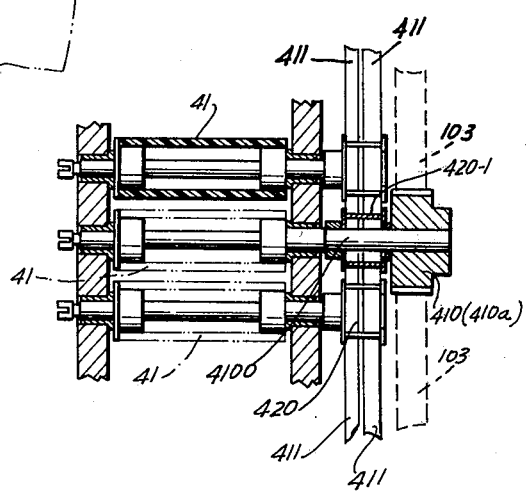
FIG. 9 is a fragmentary view partially in elevation of a group of the pressing rollers of the embodiment of FIG. 8 and a portion of the selectively operated driving means therefor.

As shown in FIGS. 9 and 10, the groups of rollers 41 are rotatably mounted in fixed arcuate supports 110 which are disposed parallel and spaced from each other. As shown in FIGS. 9 and 10, "Timing belt" pulley 410 is mounted on the shaft 4100 to drive the central presser roller 41 of a group of seven arcuately disposed presser rollers. The presser rollers of such group are drivingly connected to turn in the same direction by a plurality of narrow belts 411 which run in side-by-side relationship over a pulley 420-1 on shaft 4100 and on similar pulleys 420 on the shafts bearing the other pressure rollers 41. More specifically, one belt 411 is entrained above the pulley 420-1 and a radially outwardly disposed idle roller 420 mounted upon the supports 110, the belt then running about the pulley 420 of the roller 41 disposed for example to the right of the roller on shaft 4100 in FIG. 10. A drive is established between the central rollers, the roller next to it to the left in FIG. 10, and between successive rollers of the roller as set by a plurality of belts 411, each of which is entrained over to successive pulleys 420 and the corresponding idle pulley 420.

Figure 11:
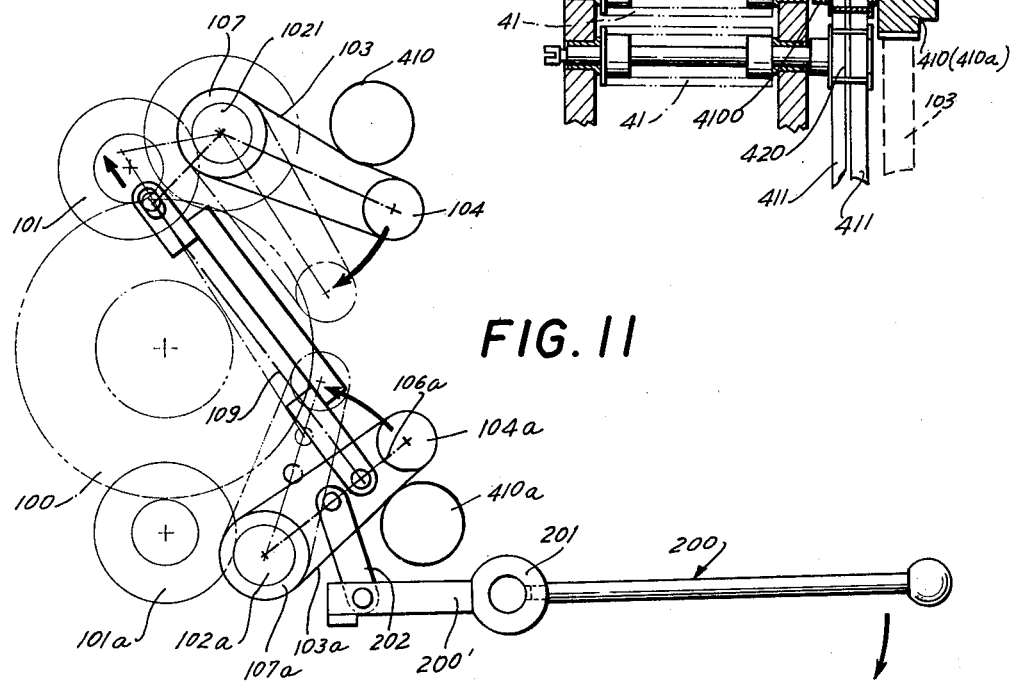
FIG. 11 is a schematic view in end elevation of the mechanism whereby the pressing rollers may selectively be either idle or driven.

In FIG. 11 there is schematically shown the mechanism whereby the upper arm 106 and its respective belt 103, as well as the lower arm 106-a and its respective belt 103-a are swung in directions indicated by the curved arrows from their outer positions in which they drive the presser rollers 41 to their inner positions in which the drive to the presser rollers is disconnected and such rollers are idle. An operating lever 200 is pivotably mounted at 201 on fixed structure, not shown. The left-hand arm 200' is connected to the lower arm 106-a by link 202. A lever arm 108 is connected to the upper arm 106 so as to turn therewith. The lower arm 106-a is connected to the radially outer end of the lever arm 108 by a link 109. It will thus be seen that when the right-hand end of the lever 200 is swung downwardly, the belts 103, 103-a are swung away from the respective driving pulleys 410, 410-a, and that when the right-hand end of the lever 200 is swung upwardly the belts 103, 103-a drivingly engage the respective pulleys 410 and 410-a.

Although the invention is illustrated and described with reference to a plurality of preferred embodiments thereof, it is to be expressly understood that it is in no way limited to the disclosure of such a plurality of preferred embodiments, but is capable of numerous modifications within the scope of the appended claims.

We claim:

1. Apparatus for cutting the connecting portions between sausages forming a sausage chain, said apparatus being adopted for use with sausage chains formed of sausage having a longitudinally curved configuration, said apparatus comprising a sausage position correcting means arranged in the form of an arc, a sausage guide means, a driving drum arranged for receiving sausages transferred through said guide means, said guide means comprising pairs of rollers each disposed in a direction perpendicular to the circumferential surface of the driving drum, the rollers of successive pairs thereof being arranged so that the spacing between the rollers in each pair gradually decreases in the direction of travel of the sausage chain with the drum, a pressing means arranged to face the sausage receiving surface of said driving drum, and a cutter mechanism for cutting the connecting portions of the sausage chain, the cutter mechanism being arranged along the sausage conveyance path of said driving drum, the sausage position correcting means comprising idling rollers which are arranged in a laterally extending manner along the circumference of the driving drum.

2. The apparatus according to claim 1, in which said pressing means comprises idling rollers, each flexible idling roller being formed of a flexible tube in the form of a hollow, cylindrical, air-tight body.

3. The apparatus according to claim 2, in which each roller has an air passage for feeding air into the roller by way of an opening through the wall of the axle communicating with the air passage.

4. The apparatus according to claim 1, wherein the pressing means comprises a plurality of presser rollers, and means selectively to drive the presser rollers and to permit them to be rotated idly by engagement with the sausages travelling therepast on the drum.

5. The apparatus according to claim 4, wherein the means to drive the presser rollers is driven in synchronism with the drum.

6. The apparatus according to claim 5, comprising a rotatably driven shaft on which the drum is mounted, and the means to drive the presser rollers is driven by said shaft.

* * * * *